US008730885B2

(12) United States Patent
Gopalakrishnan et al.

(10) Patent No.: US 8,730,885 B2
(45) Date of Patent: May 20, 2014

(54) METHOD FOR IMPROVED ROBUST HEADER COMPRESSION WITH LOW SIGNAL ENERGY

(75) Inventors: Nandu Gopalakrishnan, Chatham, NJ (US); Anil M. Rao, Wheaton, IL (US); James Paul Seymour, North Aurora, IL (US)

(73) Assignee: Alcatel Lucent, Paris (FR)

( * ) Notice: Subject to any disclaimer, the term of this patent is extended or adjusted under 35 U.S.C. 154(b) by 365 days.

(21) Appl. No.: 12/931,652

(22) Filed: Feb. 7, 2011

(65) Prior Publication Data

US 2012/0201205 A1 Aug. 9, 2012

(51) Int. Cl.
*H04W 72/12* (2009.01)
(52) U.S. Cl.
USPC .......................... 370/329; 370/341; 370/348
(58) Field of Classification Search
USPC ........................................ 370/328, 329, 389
See application file for complete search history.

(56) References Cited

U.S. PATENT DOCUMENTS

| 6,519,705 | B1 * | 2/2003 | Leung | 713/300 |
|---|---|---|---|---|
| 7,738,455 | B2 * | 6/2010 | Keshavarzian et al. | 370/390 |
| 2006/0268865 | A1 * | 11/2006 | Yokota | 370/389 |
| 2009/0028091 | A1 * | 1/2009 | Dimou | 370/328 |
| 2010/0070588 | A1 * | 3/2010 | Sinn et al. | 709/206 |
| 2011/0072327 | A1 * | 3/2011 | Schoppmeier et al. | 714/749 |
| 2011/0103301 | A1 * | 5/2011 | Mueck et al. | 370/328 |

FOREIGN PATENT DOCUMENTS

| EP | 1 635 512 A1 | 3/2006 |
|---|---|---|
| WO | PCT/US2012/021808 | 4/2012 |

OTHER PUBLICATIONS

3 GPP TSG-WG2#60 , HARQ operation in case of UL power limitation by Erricson, Nov. 2007.*
Susitaival R et al: "LTE Coverage Improvement by TTI Bundling", 2009 IEEE 69th Vehicular Technology Conference; Apr. 26-29, 2009, Barcelona, Spain, IEEE, Piscataway, NJ, USA, Apr. 26, 2009, pp. 1-5.
Ericsson: "On Uplink Coverage for LTE", 3GPP Draft; R1-080865, 3rd Generation Partnership Project (3GPP), Mobile Competence Centre; 650, Route Des Lucioles; F-06921 Sophia-Antipolis Cedex; France, vol. RAN WG1, No. Sorrento, Italy; Feb. 6, 2008, 3 pages.
Alcatel-Lucent: "Multi-Process Transmission Technique to Improve Uplink Coverage for LTE", 3GPP Draft; R1-080443, 3rd Generation Partnership Project (3GPP), Mobile Competence Centre; 650, Rute Des Lucioles; F-06921 Sophia-Antipolis Cedex; France, vol. RAN WG1, No. Sevilla, Spain; Jan. 9, 2008, 9 pages.
Ericsson: "HARQ operation in case of UL Power Limitation", 3GPP TSG-RAN WG2, vol. Tdoc R2-074940, No. 60, Nov. 5, 2007, pp. 1-5, available on-line at http://www.3gpp.org/ftp/TSG_RAN/WG2_RL2/TSGR2_60/Docs.
Yong Fan et al.: "MAC 23-1—Downlink VoIP Support for Evolved UTRA", Wireless Communications and Networking Conference, 2008. WCNC 2008. IEEE, IEEE, Piscataway, NJ, USA, Mar. 31, 2008, pp. 1933-1938.

* cited by examiner

*Primary Examiner* — Dang Ton
*Assistant Examiner* — Pamit Kaur
(74) *Attorney, Agent, or Firm* — C. Bilicska

(57) ABSTRACT

A method is provided a wireless system for reliably transmitting context information in robust header compression at low signal energies. More particularly, the methodology of the invention provides an elongated virtual Transmission Time Interval (Super TTI) for the first few (in particular, the first) non-compressed packet (that includes upper layer headers) of a packet stream transmitted using ROHC compression. Improved reception reliability for the uncompressed packet, in particular to decode the headers, results by application to the Super TTI of a combination of TTI Bundling techniques, RLC segmentation and association with multiple HARQ processes and use of enough HARQ rounds.

17 Claims, 4 Drawing Sheets

| FIG. 3A |
| FIG. 3B |

METHOD FOR IMPROVED ROBUST HEADER COMPRESSION WITH LOW SIGNAL ENERGY

FIELD OF THE INVENTION

The present invention generally relates to coding of information in a wireless communications system.

BACKGROUND OF THE INVENTION

Voice communication in wireless systems has conventionally been provided via circuit-switched wireless telecommunication networks of the art, which allow a mobile unit to establish a fixed connection, or link, to the network via a radio bearer. However, as wireless technology evolves from voice-centric to data centric—a process begun in $3^{rd}$ generation (3G) systems and expected to be completed with $4^{th}$ generation (4G) systems, voice signals (along with data) are increasingly transmitted over a packet-switched network using a Voice over Internet Protocol (often referred to as VoIP).

For implementation of VoIP in a wireless telecommunication network, the speech data frames are embedded in Internet Protocol (IP) data packets. The IP packet headers may increase the size of the data packets that are transmitted by the wireless telecommunication network, thus somewhat reducing the capacity of a packet-switched wireless telecommunication network relative to a circuit-switched wireless telecommunication network. However, the IP packet headers may generally be compressed to reduce the overhead associated with transmitting speech data using VoIP. A commonly applied compression method, robust header compression (ROHC), reduces the size of the IP packet header by removing predictable and/or static information from the header. Using ROHC, the size of the IP packet header may be reduced by approximately an order of magnitude by reducing the information in the IP packet header to a sequence number, a context identifier, and a time stamp. Taking into consideration the packet payload, which is not compressed, the size of the total packet transmission (payload plus header) is reduced by approximately one-half by such ROHC compression.

Not all IP packet headers may be compressed. For example, it is generally necessary to send uncompressed or partially compressed IP packet headers when a mobile unit is being initialized or resynchronized, or when the network is recovering from an error. The uncompressed, or partially compressed, IP packet headers may include static and/or dynamic information that may be used to resynchronize the mobile unit or to recover from one or more transmission errors. Such static and/or dynamic information, usually characterized as "context" and usually sent for only the first few packets of a packet stream, provides context for the decompression of subsequent compressed packets of the packet stream. However, for mobile terminals located in weak signal areas, such as at a cell edge, the available signal energy, even at the terminal's maximum transmission power, may be insufficient to reliably transmit a packet having such context information included (in addition, of course, to the voice payload of the packet)

SUMMARY OF INVENTION

A method is provided a wireless system for reliably transmitting context information in robust header compression at low signal energies. More particularly, the methodology of the invention provides an elongated virtual Transmission Time Interval (Super TTI) for the first few (in particular, the first) non-compressed packet headers of a packet stream transmitted using ROHC compression. Improved reception reliability for the uncompressed packet headers results by application of the Super TTI that is essentially obtained by a combination of TTI Bundling techniques, RLC segmentation and association with multiple HARQ processes and use of enough HARQ rounds. The use of the Super TTI of the invention necessarily results in a large delay to the next few (in particular two or three) packets in the packet stream, which delayed packets are therefore deliberately discarded. In a further embodiment, the invention methodology addresses alternative approaches for effecting discard of the delayed packets.

BRIEF DESCRIPTION OF THE FIGURES

The teachings of the present invention can be readily understood by considering the following detailed description in conjunction with the accompanying drawings, in which.

DETAILED DESCRIPTION

Figure 1:
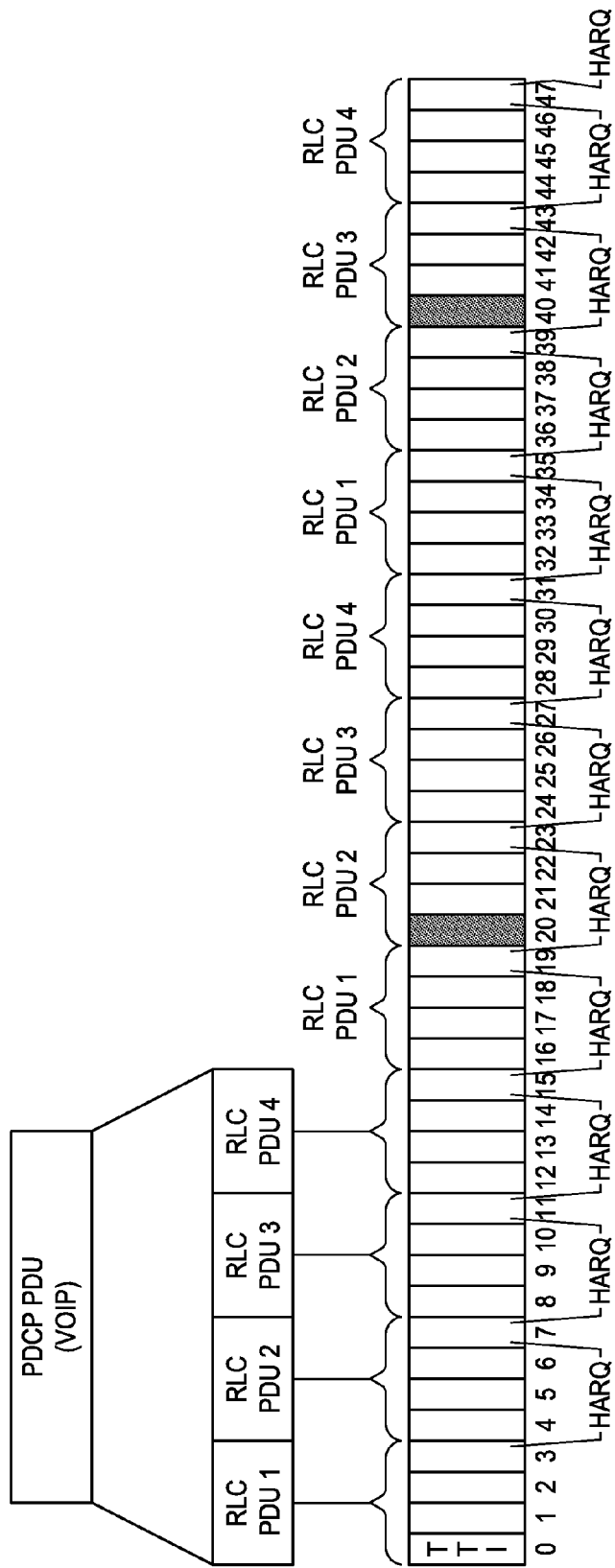
FIG. 1 provides a schematic depiction of the methodology of the invention.

In the following description, for purposes of explanation and not limitation, specific details are set forth such as particular architectures, interfaces, techniques, etc., in order to provide a thorough understanding of illustrative embodiments of the invention. However, it will be apparent to those skilled in the art that the invention may be practiced in other illustrative embodiments that depart from these specific details. In some instances, detailed descriptions of well-known devices, circuits, and methods are omitted so as not to obscure the description of described embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

The invention is described hereafter in terms of an adaptation of a known transmission-time-interval approach to achieve reliable transmission of ROHC context information in conditions of low signal energy. While the disclosed invention methodology is generally described for an exemplary case of an implementation in a wireless system providing VOIP service according to the LTE standards and applying the ROHC compression methodology, it should be readily apparent that the inventive concept is applicable to other wireless applications in which reliable reception of a few packets from a power-limited mobile transmitter can operate to establish context for subsequent packets transmitted at a lower information rate, but the mobile transmitter is unable to achieve a required information rate for those few packets at its maximum transmission power level.

As noted in the Background section, application of the ROHC algorithm for packet compression requires that a full packet header be transmitted for a small number of initial packets (possibly for only a single packet) in order to establish context information for decompression of subsequently-transmitted compressed packet headers. Because the information content (number of bits) for a full packet header is much greater than that of the later compressed headers with ROHC compression, the bandwidth and/or total signal energy needed for transmission of the context information provided by the uncompressed header is also generally much greater than that required for the compressed headers. This becomes a matter of considerable import for a mobile terminal sending ROHC compressed packets when the terminal is located in a weak signal area, such as at a cell edge. In such circumstances, even though the signal energy per bit associated with transmissions from a mobile terminal positioned at a considerable distance from its serving base station may be completely adequate for reliable communication of the relatively smaller compressed packet headers, the signal energy per bit available from the same distant mobile terminal transmitting with the same maximum power may be insufficient for reliable communication of the much larger full packet headers at the initiation of a packet stream transmitted using ROHC— because the data rate required for transmission of the full header information cannot be achieved at the available signal energy level.

Before describing the methodology by which the invention addresses that problem, it may be useful to briefly describe certain parameters or concepts known in the art that will be referred to in the course of that description. First, a parameter called Transmission Time Interval (TTI) is used in many wireless communication protocols to denote an interval of time required for the transmission of a unit of data offered for transmission, that unit generally being a packet. In LTE, the duration of a TTI is 1 ms.

To improve the reliability of information transmission over a wireless link, an error correction protocol is usually applied. A powerful such error protection protocol frequently applied is called Hybrid Automatic Repeat Request (HARQ). The HARQ process is an error correction protocol involving feedback from a receiver to a transmitter that a transmitted packet was correctly received (ACK), or alternatively, that the packet was not correctly received (negative ACK or NACK). With the HARQ process, the error feedback is normally transmitted following each packet transmission, and a given packet will be retransmitted in response to receipt of a NACK (or the absence of an ACK and time-out of a timer), with such retransmissions of the given packet continuing until an ACK is received. The time from the beginning of a packet transmission through receipt of a NACK and beginning of the packet retransmission is referred to as a HARQ round-trip-time, or HARQ RTT. Additionally, in HARQ undecoded received symbols of previous failed transmissions of a given packet are combined with the current one in attempting a new decode—thus the energy spent in previous failed transmissions is not wasted but in effect accumulates.

One approach of the art for improving the likelihood of a packet being correctly received for packets transmitted in circumstances or the available signal energy associated with a given TTI being less than that needed for reliable transmission of a packet's information content is known as RLC segmentation. In that approach, the Radio Link Control (RLC) protocol layer operates to segment a transmission unit (generally referred to as a protocol data unit (PDU)) received from a higher layer (such as the Packet Data Convergence Protocol (PDCP) layer) into several smaller units, with each of those smaller units being transmitted in a separate TTI. While this approach is generally successful in overcoming the signal energy limitation for a distant mobile unit, it suffers from a drawback of significantly increasing overhead and control signaling. Accordingly, an approach called TTI bundling has been developed to more efficiently address the problem of a mobile user being unable to transmit an entire full-header packet during one TTI, due to a lack of available signal energy. The TTI bundling approach is described hereafter.

As is known, the transmit energy for a wireless signal is a function of the transmitter power and of the transmission time. Thus the higher transmit energy needed for a given required data rate from a distant mobile may be achieved either by an increase in transmission power or by use of a longer transmission interval. Because the transmission power is assumed to already be at its maximum level at the cell edge, the only option is an increase in transmission time. In keeping with this constraint, TTI bundling operates to transmit a full-header packet—e.g., an initial VoIP packet (corresponding to the PDCP PDU described above)—as a single PDU during a bundle of subsequent TTIs without waiting for the HARQ feedback—i.e., HARQ feedback is only expected for the last transmission of the bundle. Should the HARQ feedback be negative (i.e., a NACK) the packet is retransmitted in a subsequent TTI bundle as further described below.

It is well known that voice packets of a user during a talk spurt arrive at 20 ms intervals for all the standard codecs, to begin transmission over the air (at the 0, 20, 40, . . . , tick marks by established convention) under semi-persistent scheduling. For the exemplary LTE wireless system assumed as a basis for this description, under normal TTI (1 ms) operation, the HARQ round trip time is 8 ms, implying that up to five successive HARQ rounds of the first packet occur at the 0, 8, 16, 24 and 32 ms ticks with semi-persistent scheduling but cannot stretch to the 40 ms tick since that would cause collision with the third packet.

With TTI Bundling, four TTI/subframes (4 ms bundle) per HARQ round are aggregated to transmit one RLC/MAC PDU. However, a tradeoff with TTI bundling is that the HARQ round trip time (RTT) is also doubled to 16 ms.

Further, as TTI bundling quadruples the nominal TTI interval (to 4 ms), and since the corresponding HARQ RTT will be 16 ms, the implication is that a voice packet can technically use a delay budget of up to 80 ms without worry of collision with a subsequent voice packet—utilizing five HARQ rounds occurring at the 0, 16, 32, 48, 64 ms tick marks. Thus, the user now nets four times as much transmit energy (i.e., 20 ms worth, a 6 dB link budget improvement over normal TTI operation) with a corresponding resource usage cost.

Increasing total transmission time, such as with TTI bundling, is ordinarily subject to two limits. One, an air-interface delay constraint (derived from an end-to-end delay constraint), requires that the packet be delivered within D seconds of its arrival at the mobile unit transmitter. This delay is generally related to the Quality of Service required for a particular application. For example, VOIP is relatively delay-intolerant, while some data applications may accept fairly large end-to-end delay. Furthermore, in a queuing system with packets arriving every T seconds, the service time for processing and transmitting individual packets should be no greater than the length of the packet-arrival interval, T, so that the queues do not grow unboundedly. The TTI bundling approach of the art will generally be unable to accommodate these constraints for a packet containing a full context header and transmitted from a mobile terminal at or near the cell edge.

In such circumstances—i.e., packet with full context header transmitted from cell edge, even a packet service time equal to the packet arrival interval, T, is likely to be insufficient to guarantee successful packet receipt for an initial ROHC packet with the available transmission power. Although this scenario would appear to suggest a failed call for the application—and this may very well be true for an individual packet, that is not necessarily the case for the ensemble or stream of packets that comprise the application.

Notwithstanding improvements in available transmit energy produced by TTI bundling, none of the TTI bundling solutions of the prior art are adequate to support a large VoIP payload without ROHC. This will be the case for both stand-alone legacy networks and for overlay systems where a next generation or upgrade technology network is overlaid with the legacy network—such as the exemplary LTE network described herein overlaid with a legacy 3G network. To address this deficiency, the inventors disclose herein an improvement over the TTI bundling approach of the art, which they characterize as a Super TTI.

The basic approach of the invention is to temporarily break the stable queue restrictions (and semi-persistent scheduling restrictions) of the methods of the art, and allow at least the first non-compressed ROHC packet to be transmitted with a desired high probability of success and thereby establish ROHC context so that subsequent packets may be compressed for transmission by ROHC. The Super TTI bundling approach of the invention is expected to provide well over 20 ms (60-80 ms) transmit energy for the first VoIP packet.

The operation of the Super TTI bundling methodology of the invention is schematically illustrated in FIG. 1. According to that methodology of the invention, after establishing that a mobile-terminal/user-equipment (UE) VoIP bearer queue has data to send—PDCP PDU in the figure, the base station (eNB) schedules a grant with a Transport Block Size (TBS) less than the PDCP PDU (VoIP) packet size (for VoIP full header packet). In a preferred embodiment, the TBS should be roughly determined according to the formula:

$$TBS=(PDCP+\text{lower layer overheads})/4$$

in order to force the UE RLC layer to segment the PDCP packet into four parts—RLC PDU1, RLC PDU2, RLC PDU3 and RLC PDU4 in FIG. 1.

Then, each RLC segment is transmitted over a maximum of Q HARQ rounds with TTI bundling turned on (in order to minimize RLC segmentation and overhead). Illustratively, RLC PDU1 is transmitted in a TTE bundle comprising TTIs 0, 1, 2 and 3 for the first HARQ round, in a TTI bundle comprising TTIs 16, 17, 18 and 19 for the second HARQ round, in a TTI bundle comprising TTIs 32, 33, 34 and 35 for the third HARQ round, and so on, up to a maximum of 5 HARQ round. RLC PDUs 2-4 are similarly transmitted in the next adjacent TTI bundles, as illustrated in the figure, up to a maximum of 5 HARQ rounds. Thus one long "Super TTI" is created with length 'supertti'=Q*4*4 (Q being the number of HARQ rounds used, and a function of the transmit energy shortfall). An example value of Q=5 implies a supertti of 80 ms. Early termination may reduce the realized value of the supertti.

Two further points should be noted in respect to the invention methodology as illustrated in FIG. 1. First, as previously noted, voice packets are arriving at the transmission buffer at 20 ms intervals, and therefore new packets would arrive at the buffer at TTI 20 and TTI 40 (representing 20 and 40 ms from the beginning of the supertti transmission of the initial packet. As explained in more detail hereafter, those two packets (as well as a third packet that would arrive for transmission at TTI 60, if the full 5 HARQ rounds are used) will be discarded in the interest of long-term transmission queue delay. In addition, while the figure illustrates only the operation of the supertti methodology for the initial packet (containing the header context information), it should be understood that, having captured the context information for that initial packet by use of the supertti methodology, subsequently transmitted packets are ROHC compressed and thus sent using the normal HARQ process with normal total transmission times (up to typically 20 ms) in the interest of long term transmission queue stability.

Figure 2:
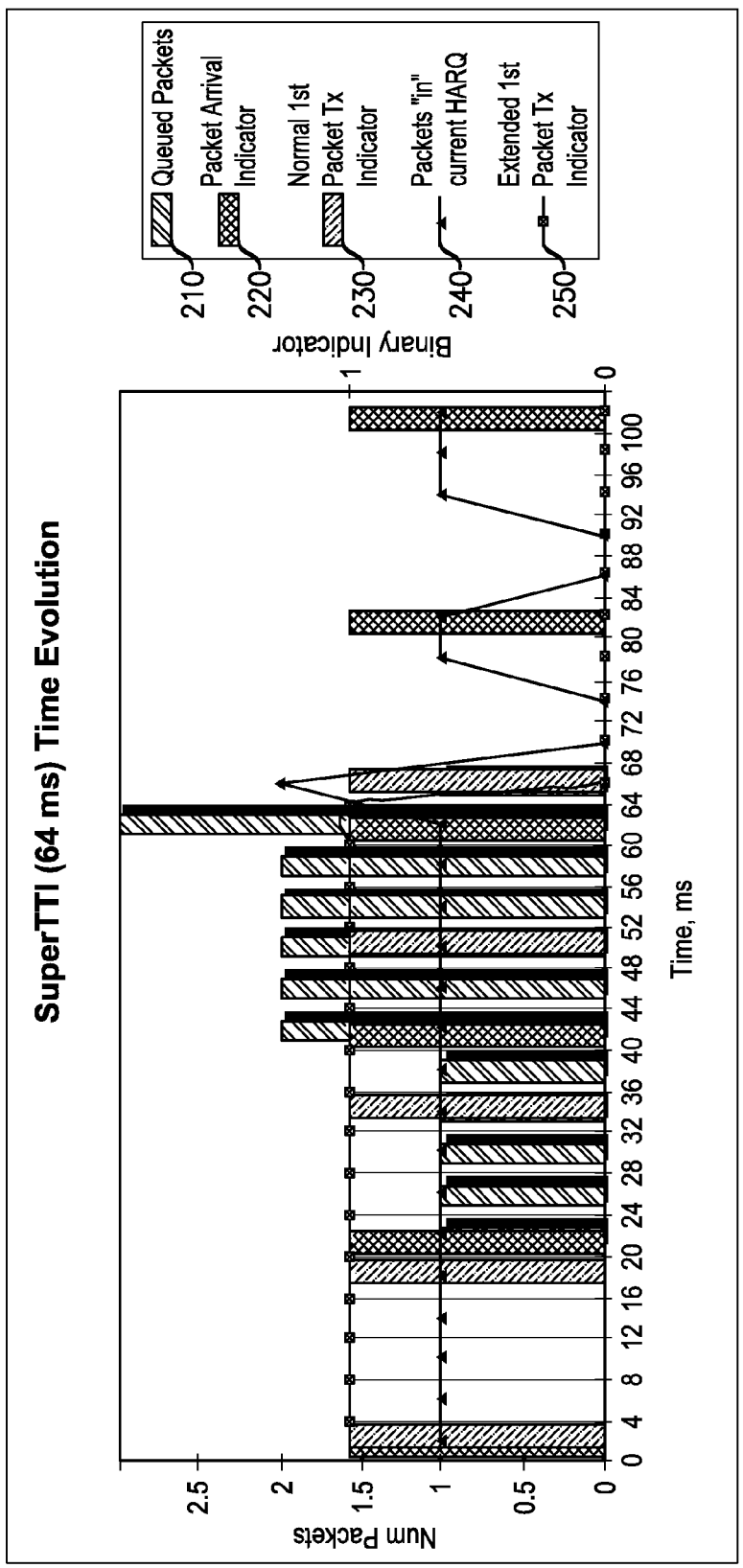
FIG. 2 provides an alternative depiction of the methodology of the invention.

An alternative depiction of the Super TTI process is shown in FIG. 2, with an expanded time scale, and also depicting packets queued in the transmission buffer at different times in the process. The figure shows a collection of graphs depicting the time evolution for an example extended transmission (SuperTTI) of 64 ms. The five cross hatched 230 indicator bars of width 4 ms and spaced 16 ms apart are the maximal five HARQ transmissions under a delay budget of 80 ms for a total transmission time of 20 ms represent the "best" normal operation for transmitting the first uncompressed packet in an offered packet stream. The elongated transmission time spanning contiguous HARQ interlaces of the invention methodology is shown by the square data point line plot 250 line with the dropdown lines. This causes the mobile's application queue to rapidly build up as shown by the double hatched 210 bars representing the number of queued packets. The build up is also a consequence of the steady arrival of new packets at the mobile terminal indicated by the single hatched 220 indicator bars spaced every 20 ms. After the elongated transmission terminates successfully, most of the queue pressure is quickly relieved by scheduling a number of packets in the next HARQ interlace as indicated by the peak in the triangular data point line plot 240 line shortly after 64 ms. As seen, such action causes the double hatched 210 bars to rapidly drop down to one and eventually zero ensuring that no transmission queue delays are carried over to future scheduled packets. An embodiment of the invention deliberately crams scheduling of these packets in just one HARQ interlace (and faking acknowledgement) for arresting delay propagation downstream although transmission failure is nearly inevitable. Thence forward compressed packets may be sent in normal mode (with normal total transmission times, i.e., up to typically 20 ms) as they arrive without any queue build up and with a normal number of packets (typically no more than one) contained within each HARQ interlace.

As noted above, in general, the Super TTI process will be stopped upon successful delivery of a non-compressed ROHC packet or of reaching a limit in the number of non-compressed ROHC packets to which the process is applied Hereafter, the number of packets transmitted via the Super TTI process is denoted by "N." If a successful reception of the non-compressed packet is obtained, two additional events (possibly overlapping) are triggered before regular ROHC transmission prevails in SPS mode: one is real-time initiation and delivery of a true ROHC feedback header on the down link (DL) commanding the UE for ROHC transmission and a (near) simultaneous clearing of "stale" packets as described below.

Due to the elongated transmission duration associated with the transmission of the first N packets (typically N=1), the SuperTTI process generally results in an inherent loss of a few packets (typically 2-3) due to ageing, and that number of "stale" packets is represented here by "K." In a preferred case, the scheduler will clear/kill the K stale packets from the UE buffer and expeditiously resume packet transmission from the $(N+K+1)^{th}$ packet. For this clear/kill function, two alternative further embodiments are provided:

(1) A discard timer set for these packets—i.e., to effect discard of a stale packet if an ACK is not received within a suitably short interval after transmission of the packet; or (2) sending a scheduling grant proportional to K and scheduling for exactly one HARQ round with minimum possible resource assigned; then forcing ACK on reception of the packet regardless of actual fate of the received packet (i.e., a false ACK).

In an alternative approach to that described above of continuing the Super TTI process until a non-compressed packet has been successfully received, the Super TTI process is stopped after the first non-ROHC packet completes all its HARQ rounds for all RLC segments (i.e., N=1). In this alternative, one would also transmit a "fake" ROHC feedback header on the DL, prepared ahead of time in anticipation of the end of the first non-ROHC transmission. If the packet has not been successfully received at the end of the first Super TTI, future ROHC packets cannot be decoded by the application and so the call is dropped. If successful reception is achieved, ROHC sync follows, the SuperTTI process is ended, stale packets in ROHC mode are cleared out as above and regular ROHC transmission prevails afterwards (if required, in SPS mode).

Figures 3, 3A:
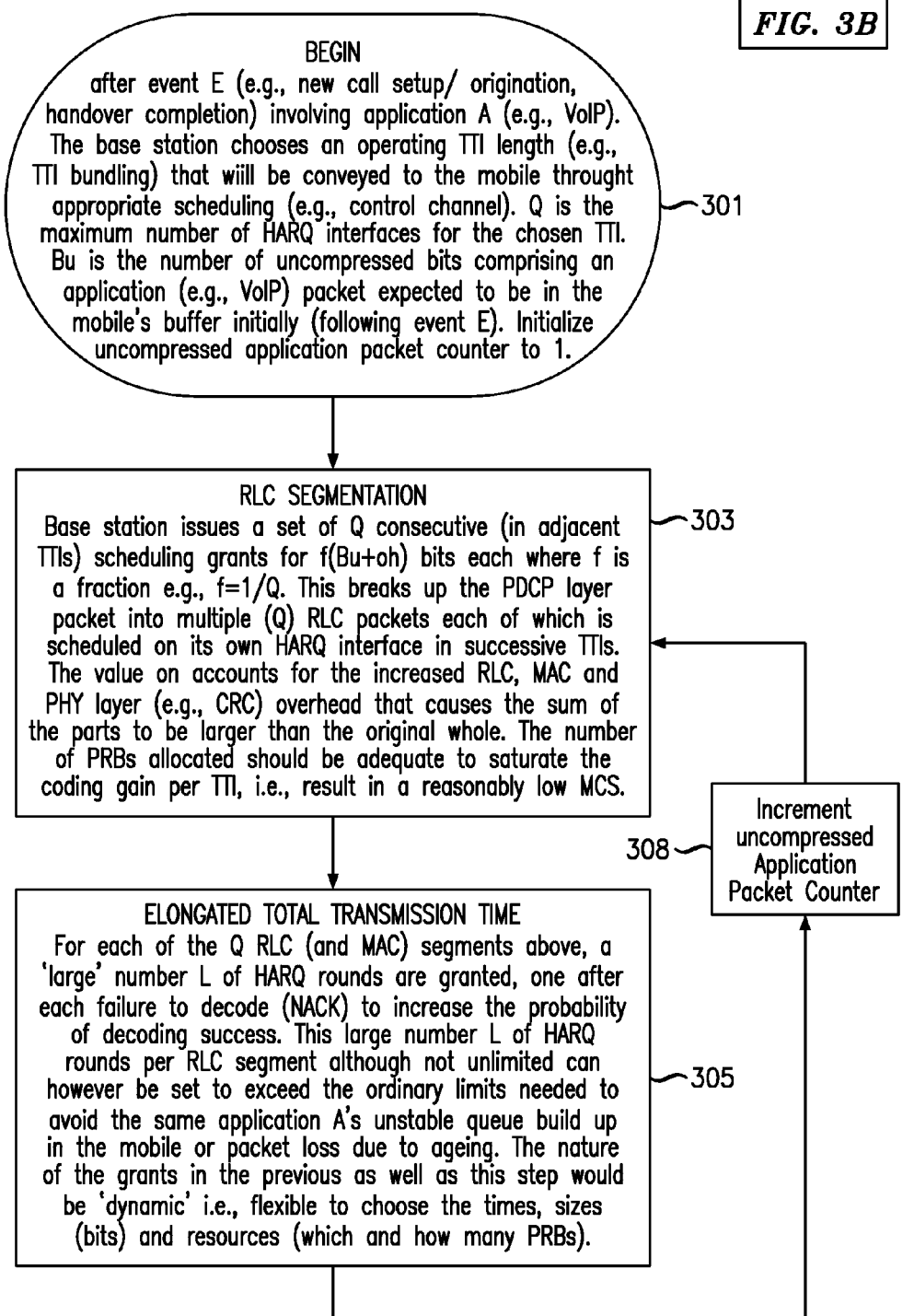
FIG. 3a provides a first portion of a flow chart depicting an embodiment of the overall process of the invention methodology.
Figure 3B:
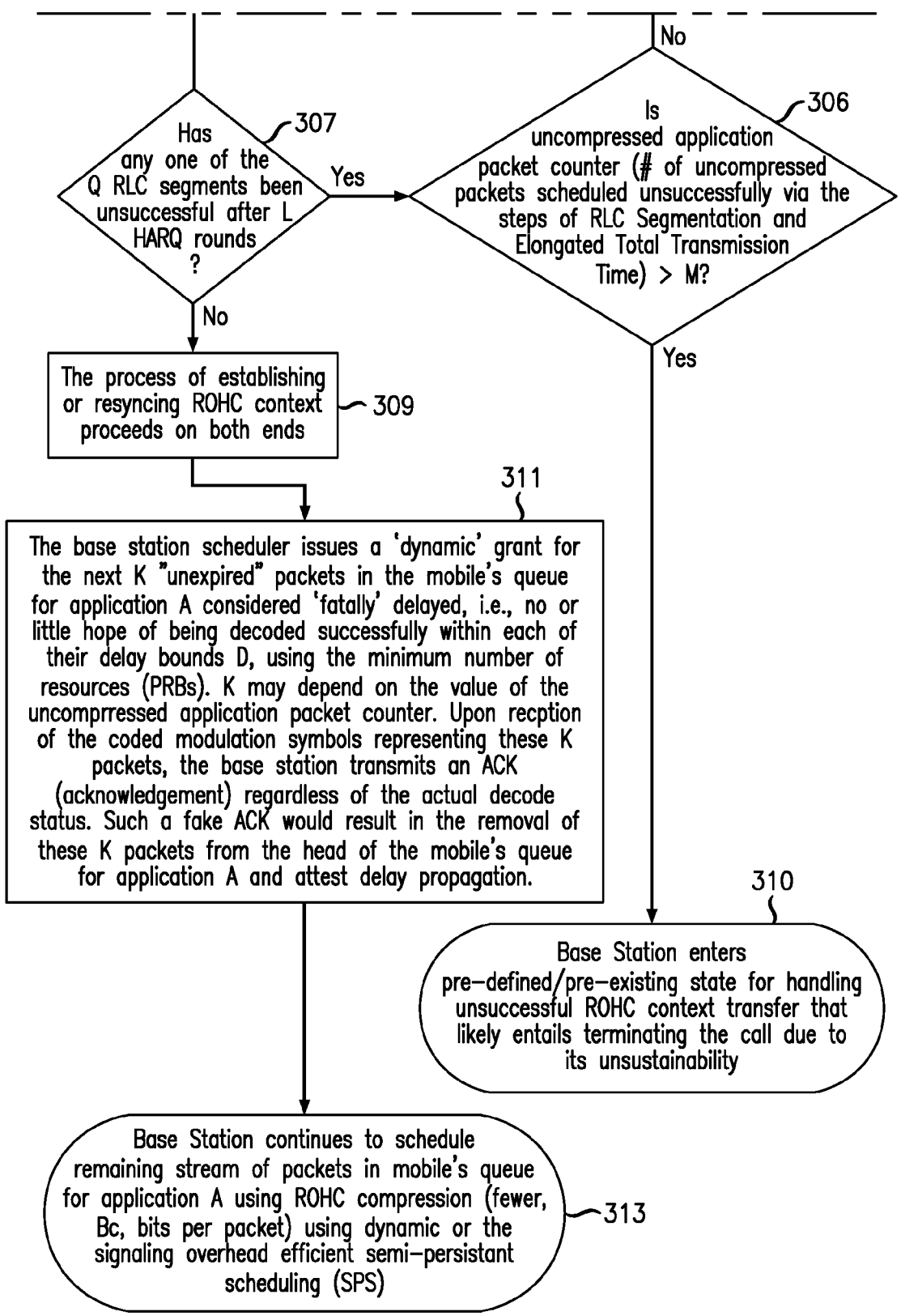
FIG. 3b provides a second portion of a flow chart depicting an embodiment of the overall process of the invention methodology.

A flow chart depicting the overall process of the invention methodology for an embodiment of the invention is shown in FIGS. 3a and 3b. With reference to that figure, the process starts at step 301, characterized as the beginning of event E, such as the beginning of a stream of VoIP packets, with the base station choosing a TTI length and number of HARQ interfaces (Q) to be carried out, and sending that information to the mobile station via a scheduling message. An uncompressed packet counter (that counts N) is also set to 1. In the next step. 303, the base station issues to the mobile station a number Q of scheduling grants for fractional portions of the first packet in the offered packet stream, each fractional portion being equal to the sum of the initial packet size and an overhead contribution divided by Q. Then, in step 305, for each scheduled fractional packet segment, the base station grants a large number of HARQ rounds for the segment to increase the probability of a successful decoding for that segment. As indicated in the figure (and hereinbefore), the choice of the number of HARQ rounds granted is determined dynamically as a function of transmission times, segment sizes and transmission resources, but is generally expected to exceed the number of rounds conventionally regarded as a limit needed to maintain transmission queue stability.

In step 307 a determination is made as to whether transmission of any of the fractional segments has been unsuccessful after L HARQ rounds. If the answer is yes, the process moves to step 306; if no, the process moves to step 309. In the event of at least one of the fractional segments not being successfully decoded (yes in step 307), the value of the uncompressed packet counter (N) is checked at step 306. Should that value be greater than a predefined threshold value M (generally determined as a number of iterations of the Super TTI methodology beyond which successful transmission/decoding of the offered packet stream is unlikely), the process moves to step 310 with call termination. On the other hand, should that counter value (N) be less than the threshold value M, the counter value is incremented by one counter step at method step 308, and the process returns to step 303.

If, in step 307, all fractional segments are determined to have been successfully decoded (thus provided the needed context for ROHC compression of subsequently transmitted packets) the process moves to step 309 where ROHC compression is implemented following protocol at the mobile station and the base station. Then, in step 311, the base station issues a schedule grant for the "stale" packets being held in the transmission buffer as a result of the operation of the Super TTI methodology, and then causes a "false ACK" to be sent to the mobile station in respect to the total MAC layer packet comprising each of those upper layer stale packets, as explained above, in order to preclude further transmission delays to future packets arising from normal processing of those stale packets.

Finally, at step 313, once ROHC compression has been implemented and the stale packets cleared from the transmission buffer, the base station continues to schedule the remaining packets in the offered packet stream using dynamic or semi-persistent scheduling with a normal total transmission time (typically up to 20 ms) and with a normal number of upper layer packets (typically no more than one) within a HARQ interlace.

In a pair of alternative embodiments of the invention, the entire PDCP packet is passed on as one RLC packet to the MAC to be scheduled as a single large over-the-air packet scheduled, in a first alternative embodiment, semi-persistently over a single interlace (HARQ process) with TTI bundling, and, in a second alternate embodiment, scheduled dynamically. TTI bundling allows for the maximal air interface delay to be stretched from 33-34 ms to 68-80 ms, and a reasonable maximum number of HARQ rounds (five) aided by the single interlace design (one RLC packet per PDCP packet). This allows for enhanced transmit energy worth 20 ms.

Both the semi-persistently scheduled embodiment and the dynamically scheduled embodiment utilize the resources (time and HARQ processes) 100% and hence provide the highest possible transmit energy. The 100% utilization also means that there is no extra freedom to leverage for dynamically scheduling in time the first HARQ round, and in this sense, the semi-persistently scheduled embodiment may be favored over the dynamically scheduled embodiment as there would be no unnecessary extra DL overhead.

Herein, the inventors have disclosed a method for providing increased transmit energy for wireless terminals located in weak signal areas. Numerous modifications and alternative embodiments of the invention will be apparent to those skilled in the art in view of the foregoing description.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved.

The invention claimed is:

1. A method for packet transmission in a wireless communication system comprising:
    dividing a packet offered for transmission into Q equal portions; and
    for each portion, scheduling transmission over multiple transmission time intervals;
    wherein a counter is implemented to maintain a count of packets offered for transmission; and
    wherein upon completion of the multiple transmission time intervals for each of the Q packet portions, if at least one of the packet portions has not been decoded successfully, a value of the counter is checked and, if that value is less than a predetermined maximum value, the method returns to the dividing step for a next packet waiting in a transmission queue.

2. The method of claim 1 wherein the multiple transmission time intervals are contiguous in time.

3. The method of claim 1 wherein, upon a successful decoding of all portions of a divided packet, the dividing step is ended.

4. The method of claim 3 wherein upon successful decoding of all portions of the divided packet, a context is provided for ROHC compression of subsequently offered packets.

5. The method of claim 3 wherein packets offered for transmission subsequent to the successful decoding of all portions of the divided packet are compressed using ROHC compression.

6. The method of claim 3 wherein upon successful decoding of all portions of the divided packet, one or more packets waiting in a transmission queue are scheduled together and acknowledged as having been received regardless of an actual outcome of reception/decoding.

7. The method of claim 3 wherein upon successful decoding of all portions of the divided packet, one or more packets waiting in a transmission queue are discarded prior to transmission based on expiry of a timer.

8. The method of claim 1 where a total transmission time over multiple transmission intervals exceeds a limit necessary for stable transmission queues.

9. The method of claim 1 wherein, if, upon completion of the multiple transmission time intervals for each of the Q packet portions, all packet portions have been decoded successfully, implementing ROHC compression for subsequent packets offered for transmission.

10. The method of claim 1 wherein the dividing step is implemented by dividing the offered packet size by Q and adding an overhead factor to each of the fractional packet increments so determined.

11. The method of claim 10 wherein a scheduling grant is issued by a serving base station for each of the Q packet portions.

12. The method of claim 10 wherein packets offered for transmission are provided from a voice over internet protocol (VoIP) application in an IP multimedia subsystem (IMS) network architecture.

13. The method of claim 12 wherein the IMS network architecture is implemented with Long Term Evolution (LTE) radio technology.

14. A method for packet transmission in a wireless communication system comprising:
receiving at a mobile station scheduling grants for a number Q of HARQ interlaces over multiple transmission time intervals;
segmenting an initial packet offered for transmission at the base station into Q equal fractional segments, wherein each segment is scheduled on its own HARQ interlace in successive transmission time intervals;
upon completion of L HARQ rounds for each of the Q packet segments, if any segment has not been successfully decoded, returning to the segmenting step with a next packet waiting in the base station's transmission queue;
if all of the Q packet segments have been successfully decoded using no more than L HARQ rounds each, implementing ROHC compression for subsequent packets offered for transmission;
upon successful decoding of all packet segments for a given offered packet, discarding one or more stale packets waiting in a transmission queue; and
continuing to transmit remaining packets offered for transmission based on ROHC compression.

15. The method of claim 14 wherein the step of discarding stale packets is implemented by receiving a scheduling grant for the one or more stale packets, and upon transmission of the one or more stale packets, receiving a signal acknowledging receipt and decoding thereof regardless of an actual outcome of reception/decoding.

16. The method of claim 14 wherein the step of discarding stale packets is implemented by discarding the one or more stale packets based on expiry of a timer.

17. The method of claim 14 wherein the segmenting step is implemented by dividing the offered packet size by Q and adding an overhead factor to each of the fractional packet segments so determined.

* * * * *